United States Patent [19]

Upchurch

[11] Patent Number: 4,609,005
[45] Date of Patent: Sep. 2, 1986

[54] TUBING ISOLATION DISC VALVE

[75] Inventor: James M. Upchurch, Sugar Land, Tex.

[73] Assignee: Schlumberger Technology Corporation, Houston, Tex.

[21] Appl. No.: 756,891

[22] Filed: Jul. 19, 1985

[51] Int. Cl.[4] .............................................. F16K 17/14
[52] U.S. Cl. ..................................... 137/68.1; 137/71; 166/317; 166/323
[58] Field of Search ............... 137/68 R, 71; 166/317, 166/319, 323

[56] References Cited

U.S. PATENT DOCUMENTS

| | | | |
|---|---|---|---|
| 2,616,502 | 11/1952 | Lenz | 166/317 X |
| 2,958,545 | 11/1960 | Stelzer | 137/68 R X |
| 3,074,486 | 1/1963 | Murray | 166/317 X |
| 3,779,263 | 12/1973 | Edwards | 137/68 R |
| 3,887,108 | 6/1975 | McDaniel | 137/68 R X |
| 3,908,684 | 9/1975 | Short | 137/68 R |
| 4,126,184 | 11/1978 | Hinriche | 137/68 R X |
| 4,245,660 | 1/1981 | Rozniecki | 177/68 R X |

Primary Examiner—Harold W. Weakley

[57] ABSTRACT

In the representative embodiment of the invention disclosed herein, a disc valve is cooperatively arranged to include a disc member of a ductile material which is transversely positioned within an enlarged chamber in the axial bore of a tubular housing and sealingly secured to the housing. A piston-actuated tubular mandrel having a forward position defining a slanted annular cutting edge with a notch on one side thereof is arranged in the housing so that as the mandrel is advanced against the disc, the inclined cutting edge will progressively sever the central portion of the disc from its peripheral portion and progressively bend that part of the central disc portion disposed in the notch outwardly to confine the central disc portion between the housing wall and the exterior of the mandrel.

4 Claims, 2 Drawing Figures

TUBING ISOLATION DISC VALVE

BACKGROUND OF THE INVENTION

1. Field of the Invention

This invention relates to valves having a disc extending across the bore of the valve housing for preventing the flow of fluid through a pipe string in a well bore until the disc is ruptured.

2. Background Information

Valves of this type have utility whenever the valve, once opened, need not be closed again. For example, such valves have been used in drill stem test tools to keep the tubing above the test tools isolated from the fluid in the well bore until such time as it is desired to expose the formation being tested to the pressure in the tubing. They can be used to keep tubing pressure from acting on a pressure operated firing head for perforating guns until everything is ready for the guns to fire.

In the past, frangible discs, usually made of cast iron, have been used for these purposes. The discs were broken by dropping a go-devil or striking the disc in some manner with sufficient force to cause the hard, brittle, material, from which it was made to shatter. As a result, there were pieces of the disc in the pipe string to be carried along with the flowing fluid and plug down hole chokes and surface equipment.

SUMMARY OF THE INVENTION

It is an object of this invention to provide a disc valve which is opened by progressively shearing the central portion of the disc from its outer peripheral portion from one side of the bore of the housing toward the opposite side of the housing until the remaining unsheared portion will bend as the central portion of the disc pivots to a position extending along the side of the housing out of the way of flowing fluid yet still connected to the annular portion held by the housing.

This and other objects of the invention are attained by providing a disc valve including a disc of ductile material and a housing that clamps the outer annular portion of the disc in the housing with the central portion of the disc extending across the bore of the housing to prevent the flow of fluid and the passage of instruments through the housing so long as the disc is intact. The disc valve of the invention further includes a pressure actuated mandrel that moves longitudinally of the housing to shear the central portion from the outer annular portion progressively from an initial contact point on one side of the housing bore and around the walls of the bore toward the opposite side of the bore until the remaining unsheared material connecting the central portion and the annular portion will bend, so that as the mandrel moves to its final position the partially severed central disc portion will be pivoted against the opposite side of the housing bore and confined there by the exterior of the mandrel thereby opening the bore.

It is a further object of this invention to provide such a valve for use in a pipe string in a well bore that is opened by increasing the pressure in the annulus between the pipe string and the well bore or casing, that allows communication between the tubing below the valve and the annulus while the valve is closed, and that closes the tubing to the pressure in the annulus before the valve is opened.

These and other objects, advantages, and features of this invention will be apparent to those skilled in the art from a consideration of the specification, including the attached drawings and appended claims.

DESCRIPTION OF THE PREFERRED EMBODIMENT(S)

Figure 1:
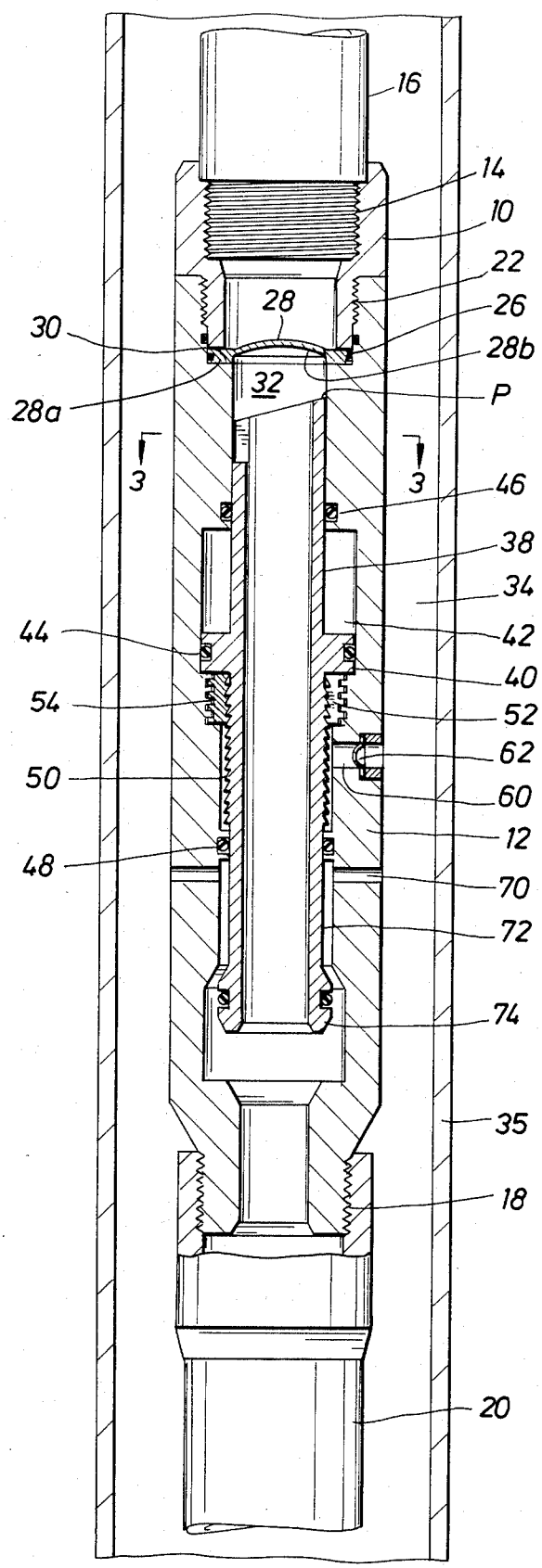
FIG. 1 is a vertical sectional view through the preferred embodiment of the disc valve of this invention with the valve closed.

For simplicity, the housing of the disc valve of this invention is shown in two parts, upper housing section 10 and lower housing section 12. Actually lower housing section 12 is made up of a number of tubular members connected together by threaded connections. Upper housing section 10 has female threads 14 for connecting the housing to pipe string 16. Lower housing section 12 has threads 18 for connecting the housing to pipe string 20 that extends below the valve.

The two housing sections are connected by threads 22. These are straight threads so that downwardly facing annular shoulder 26 on upper housing section 10 will clamp disc 28 between it and upwardly facing shoulder 30 on lower housing section 12. Outer annular portion 28a of the disc is clamped between the two shoulders while central portion 28b extends across and closes bore 32 of the housing. Outer annular portion 28a carries seal ring 29 to prevent the flow of fluid around the outside of the disc.

The central portion of the disc is convex in the direction that the expected differential pressure across the disc will act. For example, in most cases there will be no fluid pressure above the disc or only that required for a water blanket, as in a drill stem test operation resulting in the pressure of the fluid in annulus 34 between the housing and casing 35 being higher than the pressure in the tubing. Therefore, the differential pressure across the disc is in an upwardly direction.

Tubular mandrel 38 is located below the disc in the bore of the housing. Piston 40 is attached to the mandrel and located in cylinder 42 formed by a short section of increased diameter in lower housing member 12. Piston 40 carries seal ring 44 and cylinder 42 is isolated from pressure in the annulus by seal rings 46 and 48. Below piston 40, downwardly facing buttress type threads 50 on the mandrel engage upwardly facing buttress threads on split ring 52. When the mandrel is moved upwardly by fluid acting on piston 40 the threads will exert a lateral force on split ring 52 causing it to expand and allow the threads on the mandrel to ratchet past the split ring as the mandrel moves upwardly but will prevent downward movement of the mandrel relative to the split ring. Mating threads 54 on the outer surface of split ring 52 and the inner surface of the lower housing member hold the split ring from moving upwardly with the mandrel while allowing the ring to expand sufficiently for the inner threads to ratchet.

The pressure for moving piston 40 and mandrel 38 upwardly to open the valve is supplied to cylinder 42 below the piston through lateral opening 60 in the sidewall of lower housing section 12. This passage is closed by rupture disc 62, which is designed to remain intact when exposed to the normally expected differential pressure between the fluid in the annulus and atmospheric pressure in cylinder 42. When it is desired to open the valve, the pressure in the annulus is raised at the surface until rupture disc 62 fails. Annulus pressure then acts against the bottom side of piston 40 and moves the mandrel up and opens the valve.

The mandrel opens the valve by shearing central portion 28b of disc 28 from most of annular portion 28a clamped between the two housing members. In accordance with this invention, disc 28 is made of ductile material that can bend without breaking, such as Inconel 600.

Further, in accordance with this invention, to open the valve, the central portion of the disc is sheared from the annular portion, but not completely so that the central portion will remain attached to the annular portion over a narrow section that will bend without breaking to allow the central portion to be moved to a position adjacent the side of the bore of the housing. To do this the central portion is sheared from the annular portion progressively from one side of the bore to the other until the material connecting the two portions will bend rather than shear under the force of the mandrel.

Figure 2:
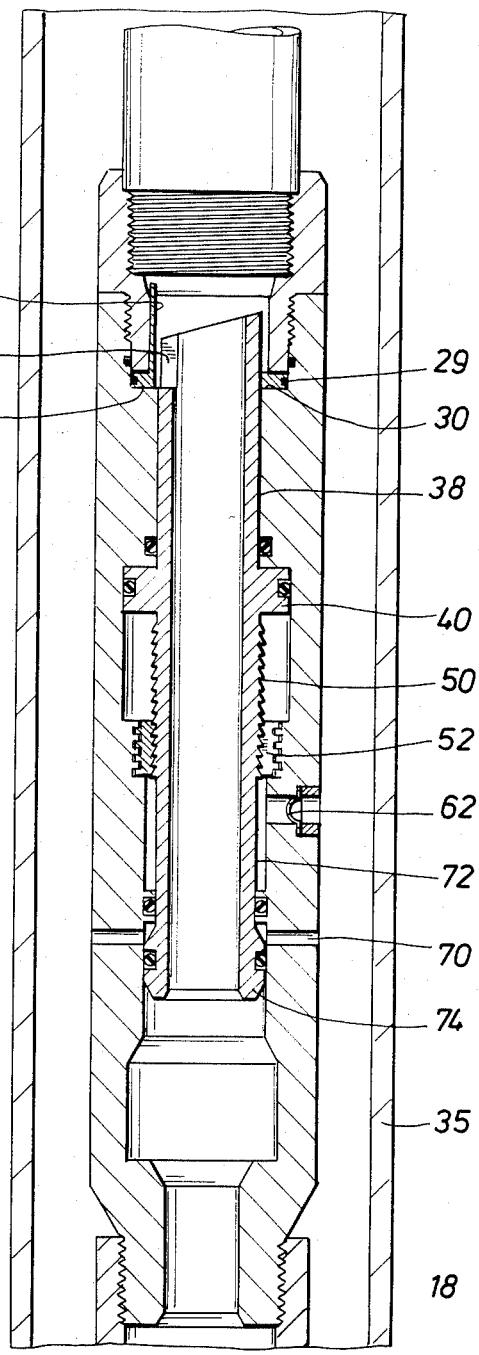
FIG. 2 is a view similar to FIG. 1 showing the valve after it has been opened.
Figure 3:
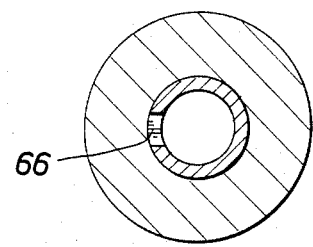
FIG. 3 is a view taken along line 3—3 of FIG. 1.

To concentrate the shearing stress properly on the disc to get the progressive shearing of the central portion from the outer annular portion, the upper end of mandrel 38 lies in a plane that makes an angle with the longitudinal axis of the bore so that the initial contact between the end of the mandrel and the disc occurs between point P on the high side of the end of the mandrel and all of the force exerted by the annular pressure acting on piston 40 will be concentrated on the disc over a very small area causing it to fail in shear rapidly. Then as the mandrel moves upwardly, the point of contact between the disc and the mandrel will move around the central portion of the disc in both directions from the point of initial engagement toward the opposite of the disc. As the disc is sheared from the outer annular portion and the two points of contact move closer to the opposite side from the initial contact, the disc will tend to begin moving upwardly at some point where it is easier to relieve the upper force of the mandrel by bending rather than shearing until the central portion of the disc will be bent upwardly along the inner wall of housing section 10, as shown in FIG. 2.

At this point, the valve is fully open, no fragments have been produced to clog up chokes and the like, and the central portion of the disc has been moved out of the way of flowing fluids and in a position where it will not interfere with the passage of instruments and the like. Mandrel 38 is now held in its upward position, as shown in FIG. 2, by split ring 52 and the upper end of the mandrel will hold central portion 28 from being moved back toward bore 32 of the housing by fluid flowing by the disc.

To insure that the central portion of the disc is not completely severed from the outer annular portion, slot 66 is located in the mandrel on the side opposite point P so that after the central portion of the disc has been sheared by the mandrel to where only the portion between the inner central portion and the outer annular portion directly above slot 66 remains, the disc will be forced to bend upwardly out of the way of the mandrel since there will be nothing to contact this connecting section and cause it to shear.

In the embodiment shown, tubing string 20 extending below the valve is connected to annulus 34 through lateral opening 70 and bore 72 of the housing to keep the pressure inside pipe string 20 and the annulus equal. Before the valve has been opened and the mandrel moved to the position shown in FIG. 2, seal 76 carried by lower end 74 of the mandrel has moved upwardly into engagement with bore 72 to prevent further communication between the annulus and the bore of the pipe string.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A full-bore well tool adapted to be tandemly coupled in a pipe string suspended in a well bore, comprising:

a tubular housing having an axial bore with a portion thereof defining an enlarged chamber;

closure means in said housing including a rupturable disc of a ductile material having a central portion extended transversely across said enlarged chamber, and means sealingly securing the peripheral portion of said disc to said housing for closing said housing bore so long as said disc is intact;

means adapted for severing a major part of said central disc portion from said peripheral disc portion and displacing said major part outwardly against one wall of said enlarged chamber, including a tubular mandrel having an unobstructed axial bore movably arranged within said housing bore and including a skewed forward end defining a slanted annular cutting edge having a forwardly-opening longitudinal notch in one segment thereof;

actuating means including piston means on said mandrel operable in response to fluid pressure exterior of said housing to advance said mandrel from an initial position where its said forward end is adjacent to said disc to a final position where its said forward end has passed through said disc for progressively severing those parts of said central disc portion successively contacted by said annular cutting edge from said peripheral disc portion and progressively bending that part of said central disc portion disposed within said notch outwardly to confine said central disc portion between said chamber wall and the exterior of said mandrel; and retaining means cooperatively arranged on said mandrel and said housing and operable upon advancement of said mandrel to its said final position for securing said mandrel in its said final position to block said central disc portion from subsequently moving inwardly across said unobstructed axial bore of said mandrel.

2. A well tool as in claim 1, wherein said segment of said cutting edge including said notch is diametrically opposite from the portion of said cutting edge that initially contacts said disc upon advancement of said mandrel.

3. A well tool as in claim 1, wherein said central disc portion is domed and is cooperatively positioned within said housing with its concave surface facing said forward end of said mandrel to better withstand pressure forces acting on the convex surface of said central disc portion.

4. A well tool as in claim 1, further including means on said housing communicating said housing bore with the exterior of said housing while said mandrel is in its said initial position, and means on said mandrel operable upon advancement thereof to its said final position for blocking communication between said housing bore and the exterior of said housing.

* * * * *